United States Patent

Nguyen et al.

[11] Patent Number: 5,843,347
[45] Date of Patent: Dec. 1, 1998

[54] EXTRUSION AND FREEZE-DRYING METHOD FOR PREPARING PARTICLES CONTAINING AN ACTIVE INGREDIENT

[75] Inventors: Thanh-Tam Nguyen, Limeil-Brevannes; Joëlle Jacquot-Leyder, Créteil, both of France

[73] Assignee: Laboratoire L. Lafon, Maisons Alfort Cedex, France

[21] Appl. No.: 906,004

[22] Filed: Aug. 4, 1997

Related U.S. Application Data

[63] Continuation of Ser. No. 530,293, filed as PCT/FR94/00281, Mar. 15, 1994, abandoned.

[30] Foreign Application Priority Data

Mar. 23, 1993 [FR] France ................................ 93 03316

[51] Int. Cl.⁶ .................................. B01J 2/04; B01J 2/18
[52] U.S. Cl. ................................. 264/9; 264/14; 264/28
[58] Field of Search .................... 264/5, 6, 7, 9, 264/13, 14, 28, 141, 142, 144; 427/212

[56] References Cited

U.S. PATENT DOCUMENTS

| | | | |
|---|---|---|---|
| 3,721,725 | 3/1973 | Briggs et al. | 264/6 |
| 4,230,687 | 10/1980 | Sair et al. | |
| 4,522,577 | 6/1985 | Ruthardt | 264/5 |
| 4,580,967 | 4/1986 | Gutierrez-Rubio | 264/13 |
| 4,848,094 | 7/1989 | Davis et al. | |
| 5,188,838 | 2/1993 | Deleuil et al. | 424/451 |
| 5,262,172 | 11/1993 | Sipos | 264/7 |
| 5,384,124 | 1/1995 | Courteille et al. | |
| 5,437,691 | 8/1995 | Lauterbach | 264/13 |
| 5,472,648 | 12/1995 | Alisch et al. | 264/9 |

FOREIGN PATENT DOCUMENTS

| | | |
|---|---|---|
| 0 204 596 A1 | 12/1986 | European Pat. Off. |
| 0 438 359 A1 | 7/1991 | European Pat. Off. |
| 0 004 182 | 3/1979 | United Kingdom |
| 2 133 983 | 8/1994 | United Kingdom |

*Primary Examiner*—Jan H. Silbaugh
*Assistant Examiner*—Kenneth M. Jones
*Attorney, Agent, or Firm*—Hoffmann & Baron, LLP

[57] ABSTRACT

The present invention relates to a process for the preparation of particles each comprising an excipient forming a matrix and at least one active ingredient uniformly distributed in the mass of said matrix, said process, which comprises the operations of extrusion and then lyophilization, being characterized in that it comprises the steps consisting of (1.) the preparation of a homogeneous mixture from
  (a) at least one active ingredient,
  (b) a physiologically acceptable hydrophilic excipient, and
  (c) water to give a pasty mixture with a viscosity below 1 Pa.s, measured at room temperature (15°–20° C.);

(2.) the extrusion of the resulting homogeneous mixture and the cutting of the extrudate to give moist particles;

(3.) the freezing of the resulting particles as they fall under gravity through a stream of inert gas at a temperature below 0° C.; and (4.) the freeze drying of said particles.

15 Claims, 3 Drawing Sheets

EXTRUSION AND FREEZE-DRYING METHOD FOR PREPARING PARTICLES CONTAINING AN ACTIVE INGREDIENT

This application is a continuation of application Ser. No. 08/530,293, filed as PCT/FR94/00281, Mar. 15, 1994, now abandoned.

The present invention relates to a novel process for the preparation of isolated particles, each of which contains at least one active ingredient useful in therapeutics, cosmetics, dietetics or nutrition, by extrusion and then lyophilization.

It further relates, by way of novel industrial products, to said particles consisting of an intimate association of a physiologically acceptable excipient and at least one active ingredient and obtained by said process of extrusion and then lyophilization.

These particles, which are hereafter called "microparticles" and have a maximum size of between 0.05 mm and 5 mm, are obtained substantially in the form of small rods or, preferably, in the form of spheres (also called "microspheres", "pearls", "beads" or "microbeads").

PRIOR ART

It is known that microparticles for use in therapeutics or nutrition have already been obtained by (i) the extrusion, at a temperature generally above or equal to 45° C., of an intimate mixture of an active ingredient and a fusible, physiologically acceptable excipient through an extrusion head having one or more dies, (ii) the cutting of the resulting extrudate at each die, especially by means of a blade or by means of periodic vibrations, and (iii) the drying of the resulting particles, which generally fall under gravity, by means of an ascending inert gas (i.e. an inert gas circulating in countercurrent to the path of the particles). In this connection, see on the one hand published European patent application EP-A-0 204 596, which describes the preparation of small cylindrical rods (cf. column 4, lines 52–57), and on the other hand published European patent application EP-A-0 438 359 and published German patent application ("Auslege-schrift") DE-B-2 725 924, which describe the preparation of spherical microparticles by extrusion under vibration (especially at a frequency of 200–400 Hz or 1800–2500 Hz according to DE-B-2 725 924). Other modalities of the extrusion technique are to be found in granted American patent U.S. Pat. No. 2,918,411 and published European patent application EP-A-0 465 338.

According to the prior art cited above, the excipient comprises or essentially consists of a preferably water-insoluble lipidic material which is fusible and will act as a solvent for the active ingredient. This lipidic material is required in order to obtain microparticles of regular shape, especially microbeads, which neither adhere to one another nor agglomerate with one another during solidification. According to said prior art, said lipidic material is heated so that it melts, the active ingredient and, where appropriate, the other components of the physiologically acceptable excipient are introduced into the resulting molten mass to form a mixture of sufficient viscosity [below 60 cP (i.e. 0.06 Pa.s) and preferably of between 10 and 20 cP (i.e. between 0.01 and 0.02 Pa.s) according to the information provided in DE-B-2 725 924, column 3, lines 52–57 ] at the temperature of the extrusion head, and the extrudate is cut (at the outlet of the extrusion head) by means of a blade or knife (preparation of small rods) or periodic vibrations (preparation of microspheres) in order to form droplets, which are generally solidified by means of a countercurrent of inert gas as they fall under gravity.

In particular, EP-A-0 438 359 points out (see page 2, lines 25–29) that the use of a very cold countercurrent or jet of gas (−10° C. to −20° C.) on the stream of microparticles has the disadvantage of increasing the viscosity of the product which is to be solidified, and hence of slowing down the crystallization of the active ingredient. EP-A-0 438 359 therefore recommends the application of less intense cooling (see page 2, lines 30–31) and the use of a fluidized bed in the microparticle receptacle in order to maintain fluidization of the microspheres which have not yet solidified completely.

It should also be pointed out that U.S. Pat. No. 2,918,411 makes provision for solidification of the molten mass at room temperature (said patent uses the expression "congealed mass", column 2, line 28, where "congealed" has the meaning of "solidified", as is apparent from the operating modalities given in Example 1; in this connection, see column 3, lines 67–68, which contain the expression: "the congealed mass is cooled to room temperature").

The use of a pasty mass containing water manifestly contradicts the teaching of the prior art relating to the extrusion technique and illustrated by the documents DE-B-2 725 924, U.S. Pat. No. 2,918,411, EP-A-0 438 359, EP-A-0 465 338 and EP-A-0 204 596 cited above.

It is known that lyophilization is a particular case of freeze drying, where the solvent to be removed from a material is water. Lyophilization comprises a so-called freezing stage followed by a so-called sublimation stage, during which the water to be removed is driven off by heating under reduced pressure. The lyophilization technique is well known and can be illustrated in particular by patents EP-B-0 159 237, U.S. Pat. No. 4,178,695, U.S. Pat. No. 4,490,407 and U.S. Pat. No. 4,883,507.

Patents U.S. Pat. No. 4,490,407 and U.S. Pat. No. 4,883,507 describe in particular the preparation of spherical coated microparticles with a diameter in the range 10–120 $\mu$m (according to U.S. Pat. No. 4,490,407) or preferably of less than 1 $\mu$m (according to U.S. Pat. No. 4,883,507) by atomization, drying by means of a stream of gas and then (a) lyophilization, in cells, of an aqueous composition containing said coated microparticles (see U.S. Pat. No. 4,490,407, column 3, lines 1–3 and column 4, lines 32–33) or (b) collection on a filter consisting of a mass which is porous to gases and is obtained by freezing, grinding, sublimation of the solvent and compression (see U.S. Pat. No. 4,883,507 from column 10, line 30 to column 11, line 26).

Lyophilization is also known to have a number of advantages. It makes it possible on the one hand to preserve the initial characteristics of the active ingredients or the characteristics which have been developed during their manufacture, and on the other hand to protect the active ingredients from degradation due to heat and water (especially by avoiding hydrolysis and oxidation reactions).

It improves the storage stability of the active ingredients at two levels in particular:

the chemical stability, which avoids degradation of the molecules present in the form of fine active particles, and the physical stability, which avoids denaturation of the characteristics of the form obtained, said denaturation causing a slowing-down of the release of the active ingredient and a modification of the organoleptic properties (such as the consistency and taste), such a disadvantage creating a difficulty as regards observance (i.e. following and respecting the prescribed posology) and hence the efficacy of the active ingredient.

Lyophilization also makes it possible on the one hand to avoid physical transformations of the dry products after removal of the solvent (in this case water), such as recrystallization and polymorphism, as is often the case in a liquid/vapor evaporation by means of heat, and on the other hand to obtain from slowly dissolving substances preparations which are more readily soluble in water. Thus, at the sublimation stage, which is the water removal stage of lyophilization, the dissolved molecules do not agglomerate to form crystals, as is the case in evaporation, and the dry product obtained theoretically remains as finely divided as it was in the initial solution.

Lyophilization also makes it possible to associate substances which are physicochemically incompatible in solution. From this point of view, it enables effervescent compositions, especially effervescent tablets, to be replaced with lyophilizates.

Finally, lyophilization contributes to the surface treatment of the particles, increasing their hydrophilic character. Thus, in water, oral lyophilizates based on active ingredients which are normally insoluble or sparingly soluble in water give a suspension in which they are still in the state initially conferred as a result of treatments such as micronization, dispersion, surface treatments, etc. Furthermore, the porous structure of lyophilizates prevents the particles from agglomerating when said lyophilizates are dispersed in water: the integrity of the original particle size is respected and particularly troublesome electrostatic phenomena are eliminated.

OBJECT OF THE INVENTION

There is a need to improve the bioavailability of active ingredients conditioned in a regular geometric shape which is of the type consisting of a matrix of physiologically acceptable excipient containing said active ingredients in its mass, and which is obtained by extrusion.

There is also a need to provide matrix particles of the abovementioned type which have the advantages of lyophilizates.

Thus, according to the invention, it is proposed to provide a novel technical solution, involving extrusion and lyophilization, for meeting the above-mentioned needs and obtaining particles of regular geometric shape which have the advantages conferred by lyophilization. This novel technical solution, which comprises extruding a pasty mixture containing water, contradicts the teaching of the prior art as regards the modalities of extrusion, according to which it was necessary (i) to avoid the presence of water in the material to be extruded, and (ii) to consequently use a fusible lipidic material in which the active ingredient was solubilized in order to obtain particles of regular geometric shape after solidification.

According to a first feature of the invention, it is proposed to provide a process for the preparation of isolated and geometrically regular particles, each of the type consisting of a matrix of excipient containing at least one active ingredient in its mass, said process avoiding the agglomeration of said particles with one another or with the walls of their receptacle during their formation.

According to a second feature of the invention, it is proposed to provide particles obtained by this process, namely by the extrusion of a pasty mixture containing water, followed by lyophilization, said particles each containing at least one therapeutically, cosmetically, dietetically or nutritionally active ingredient which is useful in both man and animals.

According to a third feature of the invention, it is proposed to provide a conditioning process in which each of said particles is covered with a continuous-wall polymer coating. As will be seen below, the coating technique used according to the invention differs from that used for tablets, which is not applicable here because of the dimensions and particularly the porosity of the lyophilizates.

SUBJECT OF THE INVENTION

The object of the invention is achieved by a novel technical solution for the preparation of matrix particles by extrusion or forming and then lyophilization.

According to the invention, a process is recommended for the preparation of particles useful especially in therapeutics, each particle comprising an excipient forming a matrix and at least one active ingredient uniformly distributed in the mass of the matrix, said process being characterized in that it comprises the production of dry cores of regular shape, preferably of spherical shape, by extrusion or forming and then lyophilization, each dry core subsequently being capable on the one hand of being coated and on the other hand of forming part of a more complex preparation.

In one practical variant, this process comprises more particularly the preparation of a pasty mixture with a viscosity below 1 Pa.s, measured at room temperature (15°–20° C.), the extrusion of said pasty mixture and the cutting of the resulting extrudate into moist particles with a size generally of between 0.01 and 5 mm, the freezing of said particles by contact with an inert fluid at a temperature below 0° C., and then the drying of said frozen particles by freeze drying.

The freezing is effected as the moist particles fall through a cooled gaseous fluid, preferably circulating in countercurrent.

The particles, optionally coated with a continuous-wall polymer membrane, which have been obtained by said process and have a maximum size of between 0.05 and 5 mm are also recommended according to the invention as an industrial product.

BRIEF DESCRIPTION OF THE DRAWINGS

The attached drawings illustrate other advantages and characteristics of the invention without implying a limitation.

More precisely.

DETAILED DESCRIPTION OF THE INVENTION

Figure 1:
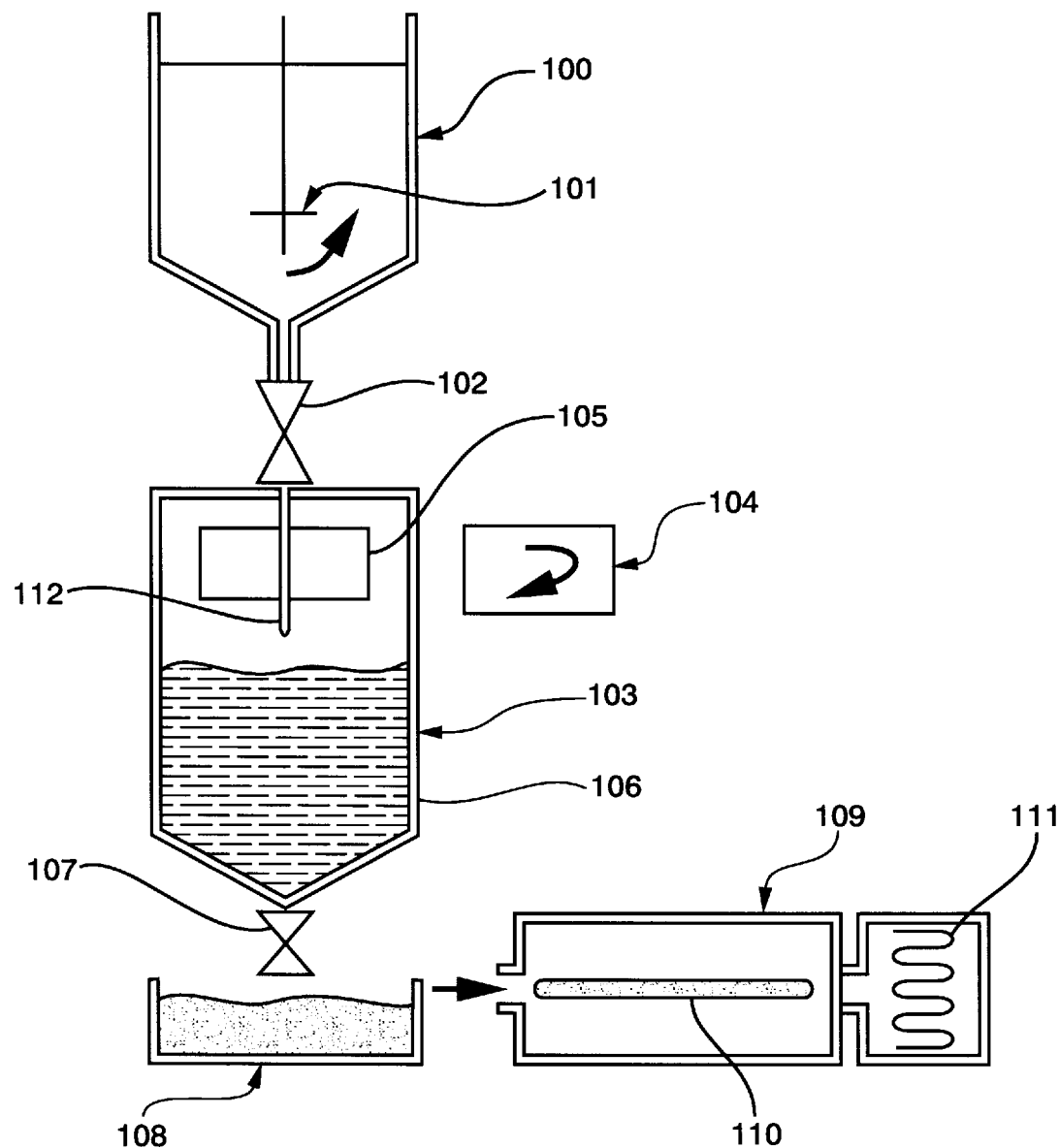
FIG. 1 schematically represents an installation for carrying out the preparative process of the invention on the industrial scale.

The process according to the invention makes it possible to obtain particles (called "microparticles" here) of regular geometric shape which is of the type consisting of a matrix of excipient containing at least one active ingredient in its mass.

The process according to the invention for the preparation of particles each comprising an excipient forming a matrix and at least one active ingredient uniformly distributed in the mass of said matrix, said process, which comprises the operations of extrusion and then lyophilization, is characterized in that it comprises the steps consisting of
(1.) the preparation of a homogeneous mixture from
   (a) at least one active ingredient,
   (b) a physiologically acceptable hydrophilic excipient, and
   (c) water
to give a pasty mixture with a viscosity below 1 Pa.s, measured at room temperature (15°–20° C.);
(2.) the extrusion of the resulting homogeneous mixture and the cutting of the extrudate to give moist particles;
(3.) the freezing of the resulting particles as they fall under gravity through a stream of inert gas at a temperature below 0° C.; and
(4.) the drying of said particles by freeze drying.

If appropriate, the process according to the invention also comprises the step consisting of
(5.) the coating of each of the lyophilized particles (i.e. the particles dried by freeze drying) with a continuous-wall polymer membrane.

When the microparticles are formed, the extrudate (called "parison" by those skilled in the art) is mechanically fragmented at the outlet of the extrusion head, which can have one or more dies. The fragmentation can be effected by means of a rotating knife or a blade pivoting with a reciprocal motion, small, substantially cylindrical rods being produced; it can also be effected by means of vibrations to produce substantially spherical microbeads.

In one variant, on the one hand cylindrical rods, especially with a length of 1 to 5 mm and a diameter of 1 to 1.5 mm, as in the prior art, are obtained from circular dies, and on the other hand approximately cylindrical or oblong rods, especially with a length of 1 to 5 mm and a thickness of 1 to 1.5 mm, are obtained from elongate dies. The fragmentation or cutting is effected in this case by means of a knife or blade which occludes said dies according to the chosen periodicity. When elongate dies are used, it is possible to make provision for one or more reductions in material over at least one surface of the rods so as to produce divisible products.

In another variant, the microbeads are obtained by periodic vibration of oscillation of the extrusion head or its die or dies. These periodic vibrations or oscillations have a frequency especially of between 50 Hz and 10,000 Hz or even above 10,000 Hz; they enable the flow of extrudate leaving the extrusion head to be broken up into identical volumes to give microbeads with a final graded diameter (i.e. after lyophilization) of between 0.05 and 3 mm and preferably of between 0.1 and 1.8 mm.

As microbeads are preferable to small rods, according to the invention, the following applies essentially to the production of microbeads, unless indicated otherwise, the teaching relating to said microbeads being directly applicable to small rods.

In step (1), the expression "substantially hydrophilic excipient" is understood as meaning that the amount of hydrophilic excipient present in the homogeneous mixture to be extruded is greater than or equal to 5% by weight, based on the weight of said mixture, the hydrophilic excipient and water together representing an amount greater than or equal to 15% by weight, based on said mixture. In other words, the excipient forming the matrix of the microbeads either consists totally of a hydrophilic excipient (general case) or comprises an association of a lipophilic excipient and a hydrophilic excipient (particular case of a matrix produced from a suspension of the oil-in-water type).

The hydrophilic excipient (b) comprises two essential components:

(b1) a polymer component with a molecular weight greater than or equal to 10,000 daltons, which swells in the presence of water, and
(b2) a water-soluble or water-dispersible component which acts as a diluent.

Component (b1) acts on the one hand as a binder in the formation of the microparticles or microbeads, and on the other hand as an agent facilitating the disintegration of said microparticles or microbeads, after lyophilization, when they are used in contact with water or an aqueous medium.

In practical terms, said component (b1) will be a substance which has a high molecular weight, especially above 10,000 daltons, and which belongs on the one hand to the group comprising colloids and polymers swellable in the presence of water, and on the other hand to mixtures thereof. Advantageously, said component (b1) will be a substance selected from the group consisting of gum arabic, xanthan gum, gum tragacanth, alginates, pectinates, polyvinylpyrrolidone, polyethylene glycols, cellulose, carboxymethyl cellulose, cellulose ethers, carboxymethyl chitin, dextran, chitosan (which is obtained by the total or partial deacetylation of chitin), gelatin, acrylic and methacrylic polymers and copolymers, colloidal silica and mixtures thereof.

It will be preferable to use a component (b1) selected from the group consisting of gum arabic, xanthan gum, polyvinylpyrrolidone, carboxymethyl cellulose, cellulose ethers (especially methyl, ethyl, propyl, hydroxyethyl or hydroxypropyl cellulose), dextran and mixtures thereof.

Advantageously, it is recommended to use 10 to 350 parts by weight of component (b1) per 100 parts by weight of active ingredient.

Component (b2) acts as a physiologically inert diluent (or ballast) for the active ingredient and is used for the cohesion of the microparticles or microbeads during formation and during their storage prior to use. In other words, it contributes to the "body" of said microparticles or microbeads since the proportion of active ingredient present in the final lyophilized material can be small. In view of its water-soluble or water-dispersible character, component (b2) has a favorable action on the disintegration of said lyophilized microparticles or microbeads. Advantageously, said component (b2) will be a substance selected from the group consisting of sugars, dextrins and mixtures thereof.

It will be preferable to use a component (b2) selected from the group consisting of lactose, glycocoll, mannitol, glucose, sucrose, maltodextrin, cyclodextrin and derivatives thereof, artificial sweeteners (especially aspartame and the other analogous dipeptides, cyclamates and saccharinates), natural or synthetic flavorings and mixtures thereof.

"Cyclodextrin" is understood here as meaning any compound of the cycloamylose type [see Merck Index, (1989), 11th edition, page 425, entry "Cyclodextrins" (no. 2724)], in particular α-cyclodextrin or cyclohexaamylose of empirical formula $C_{36}H_{60}O_{30}$, β-cyclodex or cycloheptaamylose of empirical formula $C_{42}H_{70}O_{35}$, and γ-cyclodextrin or cyclooctaamylose of empirical formula $C_{48}H_{80}O_{40}$.

"Cyclodextrin derivatives" are understood here as meaning any cyclodextrin compound in which at least one of the OH groups is etherified or esterified. Said cyclodextrin derivatives include especially the ethers in which the hydrogen atom of at least one OH group is replaced with a $C_1$–$C_4$-alkyl or $C_1$–$C_4$-hydroxyalkyl group, namely hydroxyethyl cyclodextrins, hydroxypropyl cyclodextrins and dimethyl cyclodextrins in particular.

Advantageously, it is recommended to use 5 to 350 parts by weight of component (b2) per 100 parts by weight of active ingredient.

If appropriate, the hydrophilic excipient according to the invention can contain a third component (b3), which is a surfactant of hydrophilic character. The surfactants conventionally used in galenics and capable of oral administration, particularly polysorbates, sorbitan esters, fatty glyceride polyethers, lecithins, sodium laurylsulfate, sodium dioctylsulfosuccinate and mixtures thereof, may be mentioned in particular among the suitable surface-active compounds.

The amount of surface-active component (b3) to be used in step (1.) is not critical. When said component (b3) is introduced into the pasty mixture to be extruded, which is mainly the case of a mixture containing an active ingredient that is insoluble or non-dispersible in water, it will generally be used in an amount of 0.05 to 3 parts by weight per 100 parts by weight of active ingredient.

The active ingredient used in step (1.) can be liquid or pulverulent and it can also be either soluble or insoluble in water. When it is pulverulent, its particle size will be between 1 and 1000 μm. As an excessive particle size (for example greater than or equal to 500 μm) does not make it possible to obtain the smallest sizes of the lyophilized microparticles or microbeads according to the invention when said active ingredient is insoluble in water, it is recommended to use active ingredient powders with a particle size of between 1 and 200 μm. Powders with a particle size of 1–30 μm are obtained by air-jet micronization and a particle size of 30–200 μm is obtained by grinding. When the pulverulent active ingredient is insoluble in water, it will be incorporated into the mixture to be extruded in such a way as to give an emulsion, especially of the oil-in-water type, said active ingredient then being introduced either into the aqueous phase or into the oily phase when said mixture is prepared.

Water is added in step (1.) on the one hand to permit the subsequent lyophilization and on the other hand, in particular, to adjust the viscosity of the pasty mixture. According to one characteristic of the invention, it is essential that the pasty mixture for extrusion should have a viscosity below 1 Pa.s. In practical terms, it is recommended that said mixture to be extruded should have a viscosity of between 0.1 and 0.3 Pa.s at room temperature, i.e. a different viscosity from that recommended in DE-B-2 725 924 (i.e. 0.01–0.02 Pa.s, as indicated above).

It is important that said pasty mixture containing water, which is to be extruded, should be homogeneous; if necessary, after preparation, such a mixture which is insufficiently homogeneous may be "glazed" by passage through a homogenizing device.

The extrusion of step (2.) is carried out at room temperature, as indicated above. In other words, to have such a temperature, the temperature of the extrusion head will be adjusted to 15°–20° C. This extrusion consists in forcing the pasty mixture through an extrusion head having one or more dies of given diameter, said extrusion head being subjected to periodic vibrations or oscillations in order to form spherical droplets.

According to another characteristic of the invention, it is important to freeze the droplets relatively rapidly in order to "fix" them in the shape which they have after fragmentation or cutting (in this case by vibration) at the outlet of the extrusion head. Thus the freezing of step (3.) is effected by means of a stream of inert gas (especially nitrogen or argon) at a temperature below 0° C. and preferably below –10° C. The droplets fall under gravity (or under excess pressure, which amounts to the same thing) as the freezing stream of gas moves (preferably) in countercurrent to the flow (or path) of said droplets.

The freezing of step (3.) by means of a stream of inert gas constitutes either the start of the freezing stage of the lyophilization or the whole of said stage.

The freezing stage of the lyophilization comprises cooling the mass to be lyophilized to a temperature of between –18° and –80° C. and preferably to a temperature of –30° to –50° C. Therefore, if for example the stream of inert gas initiates the freezing by cooling the droplets to –12° C., the freezing is continued and completed in the lyophilizer down to a temperature below or equal to –18° C. (or even below or equal to –30° C., as indicated above). On the other hand, if the stream of inert gas cools said droplets to a temperature of –45° C. for example, it is not necessary to continue the freezing in the lyophilizer.

In step (4.), the water sublimation stage in the lyophilization technique involves a gradient of temperatures and a gradient of reduced pressures, in conventional manner, (i) to go from the freezing temperature under 1 bar to a temperature of 25°–40° C. under 0.3 mbar (in 1 to 2 hours), and then (ii) to continue the sublimation for 10 minutes at 25°–40° C. under 0.05 mbar.

Advantageously, the lyophilization is carried out using plates covered with a monolayer of frozen droplets.

The installation of FIG. 1 for carrying out the process of the invention schematically comprises a mixer 100 provided with a rotary stirrer 101, in which the mixture of component (a), i.e. the active ingredient, the components of the excipient, including components (b1), (b2) and, if appropriate, (b3), and component (c), i.e. water, is prepared. After homogenization, the active ingredient is in the form of a solution, suspension or emulsion in this mixture.

Via a device 102, the mixer 100 feeds a chamber 103 housing a vibratory device undergoing periodic oscillations, 105, connected to the extrusion head. These vibrations are produced by a frequency generator 104.

From a die 112, droplets (not shown) fall under gravity towards the bottom of the chamber 103 to form the mass 106. Under the action of an ascending cold stream of inert gas (not shown) (i.e. a stream circulating in countercurrent to the flow of droplets), said droplets are frozen (for example at –15° C.). Via a device 107, the frozen droplets are charged onto a lyophilization plate 108 and then introduced into a lyophilizer 109 comprising, in particular, a tunnel 110 and a device 111 for cooling (end of the so-called freezing stage from –18° to –80° C.) and for heating (sublimation stage).

In addition, orifices (not shown) for discharging the stream of cooling gas are provided at the top of the chamber 103 and/or at the side, level with or slightly below the extrusion head.

If necessary, the portion of the chamber 103 containing the mass of frozen droplets 106, the device 107 and the plate 108 can be housed inside a cooling chamber (not shown).

If necessary, to prevent on the one hand the disintegration of the droplets and on the other hand their agglomeration (with one another or on the walls), the contents of the group of elements 106, 107 and 108 or of at least one of said elements (especially 106 and 108) can be placed in a fluidized bed. Such a fluidized bed is advantageous in particular for filling the plate 108 in the form of a monolayer of frozen droplets.

Figure 2:
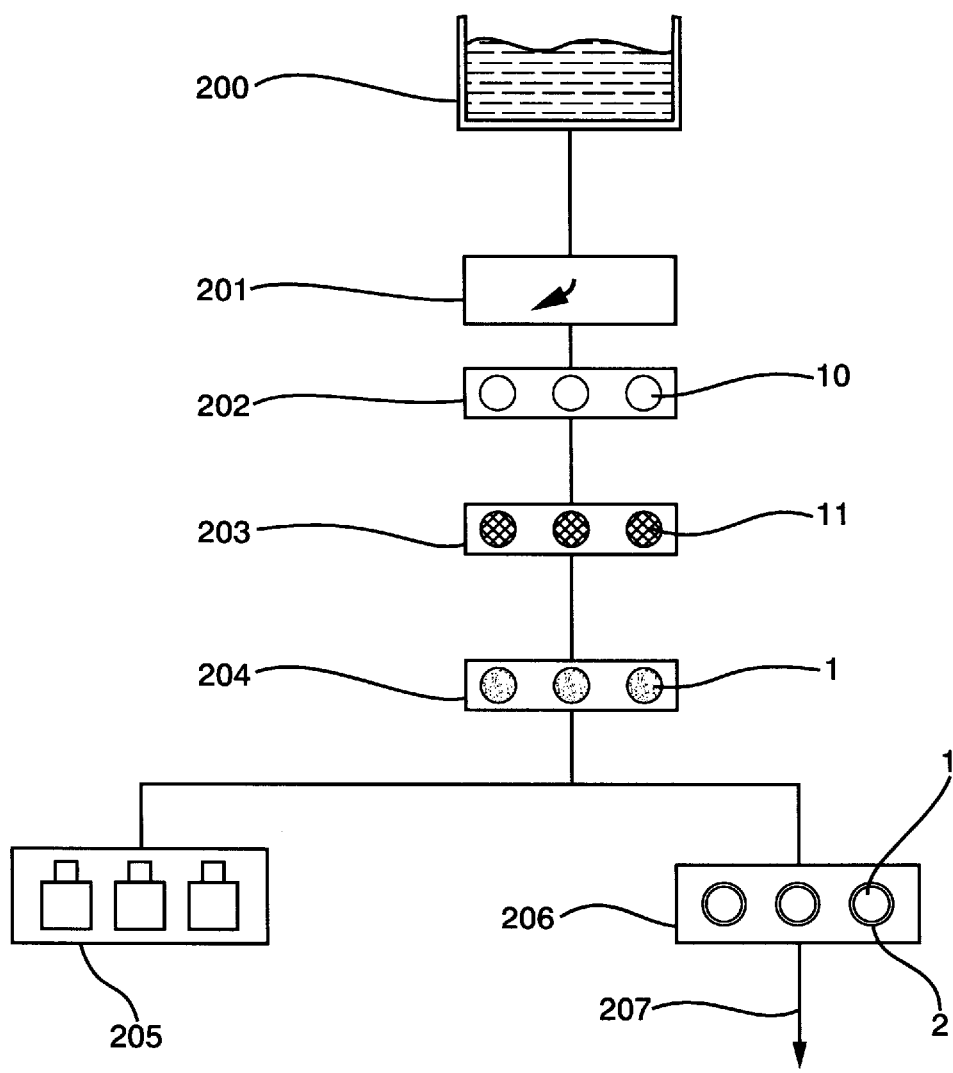
FIG. 2 diagrammatically represents a mode of carrying out the process of the invention.

FIG. 2 is a diagram illustrating a mode of carrying out the process of the invention for the preparation of microbeads. This diagram comprises:

at 200, the preparation of the mixture containing the active ingredient (a), the hydrophilic components (b1), (b2) and, if appropriate, (b3) of the physiologically acceptable excipient, and water, this mixture having a viscosity of between 0.1 and 0.3 Pa.s;

at 201, the extrusion of this mixture under vibration to produce droplets;

at 202, the isolated droplets 10 falling under gravity;

at 203, the freezing of the droplets 10 by means of the countercurrent of inert gas to produce frozen isolated droplets 11; and at 204, the lyophilization of the frozen isolated droplets 11 to produce lyophilized microbeads 1, this lyophilization here comprises the continuation of freezing followed by sublimation of the water;

the lyophilized microbeads 1 obtained at 204 are then either (i) packaged at 205, especially in bottles, or (ii) coated at 206 with a polymer envelope 2 having a continuous and preferably porous wall, and then sent in the direction of the arrow 207 for packaging, especially in bottles as at 205.

In step (5.), if preferable, the isolated microbeads obtained by the process of the invention, i.e. by extrusion and then lyophilization, are coated. As indicated above, lyophilizates can not be coated in the same way as tablets, even if it is known how to incorporate coated products into oral lyophilizates. On the other hand, it is totally conceivable to coat microbeads, especially for the purpose of masking the taste of bitter or unpleasant products, prolonging or modifying the release of the active principles or protecting sensitive active ingredients from external degrading agents.

The lyophilized microbeads can be coated with a variety of agents soluble in the stomach, either in an organic medium or in an aqueous medium with prior isolation. The coating operation can be carried out by spraying in a fluidized air bed apparatus, especially of the GLATT or WURSTER type.

The following may be mentioned especially among the coating agents:

semisynthetic cellulose derivatives such as, in particular, methyl cellulose, ethyl cellulose, hydroxypropyl methyl cellulose, hydroxypropyl cellulose phthalate and cellulose phthalate/acetate, polyacrylic and polymethacrylic acid esters, ethylene/vinyl acetate copolymers, polymethylsiloxanes, polyacrylamides, polyvinylpyrrolidone and polyvinyl acetate, polylactic and polyglycolic acids and copolymers thereof, polyurethane, polypeptides, etc.

The coating of a lyophilized microbead with a microporous semipermeable membrane, obtained by incorporating soluble products into the continuous-wall polymeric film, results in the formation of a kind of elementary osmotic pump without an additional supply of osmotic agent such as, in particular, sodium and potassium salts; being very hydrophilic by definition, the lyophilized product, when placed in the presence of water, tends to attract water from the outside: the water dissolves the active ingredient and an osmotic pressure is created which expels the aqueous solution containing the active ingredient.

The product solubilized by the water will gradually leave as the water penetrates the microbead. This gives a uniform release of the active substance. By formulating the oral lyophilizate appropriately and choosing the membrane judiciously, it is possible to modulate the release of the active ingredients "on demand", allowing effective chronotherapy in particular.

Figure 3:
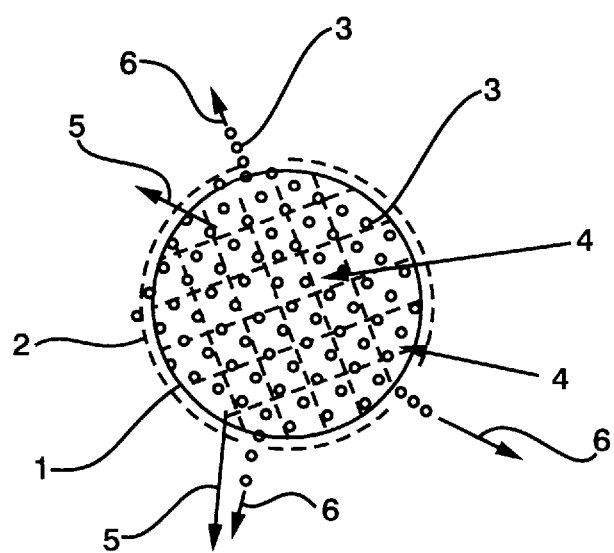
FIG. 3 schematically represents a particle according to the invention (in this case a microbead) obtained by extrusion, lyophilization and then coating.

FIG. 3 schematically illustrates the function of the coated lyophilized microbeads as osmotic "pumps" or "reservoirs". The microbead 1, which here comprises an active ingredient in the form of microparticles 3, is coated with a semipermeable film or envelope 2. After oral administration, the water or the aqueous body fluid (in this instance the gastric juice) penetrates the envelope 2 in the direction of the arrows 4 and in the direction of the arrows 5, entraining the active ingredient 3 in the direction of the arrows 6. This mode of function applies in the case where the active ingredient is soluble in water and body fluids containing water.

As a variant, it is possible to provide a coating resistant to gastric juice for release of the active ingredient in the intestine.

BEST MODE

The best mode of carrying out the process according to the invention consists in preparing microbeads with a graded diameter in the range 0.1–1.8 mm by the following procedure:

(1.) the preparation (at room temperature) of a homogeneous mixture with a viscosity of between 0.1 and 0.3 Pa.s from
  (a) 100 parts by weight of an active ingredient,
  (b) a substantially hydrophilic excipient containing
    (b1) 10 to 350 parts by weight of a polymer component with a molecular weight greater than or equal to 10,000 daltons, which swells in water and is selected from the group consisting of gum arabic, xanthan gum, polyvinylpyrrolidone, carboxymethyl cellulose, cellulose ethers (especially methyl, ethyl, propyl, hydroxyethyl or hydroxypropyl cellulose), dextran and mixtures thereof,
    (b2) 5 to 350 parts by weight of a water-soluble or water-dispersible component which acts as a diluent and is selected from the group consisting of lactose, glycocoll, mannitol, glucose, sucrose, maltodextrin, cyclodextrin and derivatives thereof, artificial sweeteners (especially aspartame and the other analogous dipeptides, cyclamates and saccharinates), natural or synthetic flavorings and mixtures thereof, and
    (b3) if appropriate, 0.005 to 3 parts by weight of a surface-active component, and
  (c) a sufficient amount of water to obtain said viscosity of 0.1–0.3 Pa.s;

(2.) the extrusion of the resulting mixture at room temperature (15°–20° C.) and the fragmentation of the extrudate by means of vibrations at a frequency of 50 to 10,000 Hz (these vibrations being applied especially to the extrusion head);

(3.) the freezing of the resulting droplets by means of a countercurrent of inert gas as said droplets fall under gravity, the freezing being continued in a lyophilizer down to a temperature of −30° C. to −50° C.; and (4.) the removal of the water in said lyophilizer by sublimation.

In this best mode, the droplets frozen by the countercurrent are collected in the form of a mono-layer, the lyophilization also being effected in the form of a charge of droplets again constituting a monolayer.

As far as the use of the lyophilized microparticles of the invention is concerned, it should be pointed out that in human and veterinary therapeutics, especially in warm-blooded animals such as mammals, it is recommended to use optionally coated microbeads (with a graded diameter of between 0.1 and 1.8 mm) intended for oral administration;

in cosmetics, it is recommended to use coated microbeads (with a graded diameter of between 0.05 and 0.5 mm) intended for incorporation into preparations of the creme, ointment or lotion type, it being possible for the coating on said microbeads to contain collagen (or a modified collagen) cleavable by the collagenases contained in perspiration;

in human dietetics, it is recommended to use microbeads or small rods; and in the field of nutrition in both man and animals, it is recommended to use small rods in which an antibiotic, a growth factor, an amino acid, a peptide or a mixture thereof is present as the active ingredient.

Other advantages and characteristics of the invention will be understood more clearly from the following description of practical Examples, which in no way imply a limitation but are given by way of illustration.

EXAMPLE 1

Microbeads of paracetamol

A mixture for extrusion is prepared which has the following formulation:

| | |
|---|---|
| Paracetamol | 100.00 g |
| Dextran 70,000 | 10.00 g |
| Xanthan gum | 0.05 g |
| Lactose | 15.00 g |
| Polysorbate 60 | 0.40 g |
| Water | 120.00 g |

The lactose, polysorbate 60 and dextran 70,000 are dissolved in the water, the paracetamol (of particle size 50–200 $\mu$m) is added and the ingredients are dispersed by means of a homogenizer operating at an angular velocity of 2000 rpm for 2 minutes. This gives a mixture with a viscosity of between 0.1 and 0.3 Pa.s at room temperature.

This mixture is introduced into an extruder whose extrusion head has several dies, each of which has an orifice 0.5 mm in diameter and is subjected to vibrations at a frequency of 100 Hz. The droplets formed are frozen by means of a countercurrent of nitrogen and are then cooled (in the freezing stage of a lyophilizer), in the form of a monolayer, to a temperature of between −40° C. and −45° C.

The water is removed from the frozen droplets by sublimation, said droplets being heated up to +35° C. and down to a pressure of 0.300 mbar, and then for 10 minutes at +35° C. down to a pressure of 0.050 mbar.

The resulting lyophilized microbeads have an excellent mechanical strength and a particle size of 1.200 mm.

EXAMPLE 2

Microbeads of probucol

A mixture having the following formulation:

| | |
|---|---|
| Probucol | 100 g |
| Sodium laurylsulfate | 2 g |
| Dextran 70 | 13 g |
| Lactose | 30 g |
| Water | 300 g | is used to prepare microbeads according to the modalities described in Example 1, the differences being that the particle size of the probucol is 2 to 10 $\mu$m and the dies have a diameter of 0.6 mm. This gives lyophilized microbeads with a diameter of 1.5 mm.

EXAMPLE 3

Microbeads of piroxicam

A mixture having the following formulation:

| | |
|---|---|
| Piroxicam | 2.00 g |
| Dextran 70 | 6.00 g |
| Xanthan gum | 0.05 g |
| Lactose | 6.00 g |
| Tween 60 | 0.10 g |
| Water | 500.00 g | is used to prepare microbeads according to the operating modalities described in Example 1, the differences being that the particle size of the piroxicam is 2 to 5 $\mu$m and the dies each have a diameter of 0.2 mm. This gives lyophilized microbeads with a diameter of 0.500 mm.

EXAMPLE 4

Microbeads of phloroglucinol

A mixture having the following formulation:

| | |
|---|---|
| Phloroglucinol | 80 g |
| Dextran 70 | 20 g |
| Aspartame | 2 g |
| Mannitol | 10 g |
| Water | 500 g | is used to prepare lyophilized microbeads with a diameter of 0.500 mm according to the modalities of Example 3.

EXAMPLE 5

Microbeads of tiadenol

A mixture having the following formulation:

| | |
|---|---|
| Phase A: | |
| Tiadenol | 100 g |
| Polysorbate 60 | 2 g |
| Fatty acid polyethoxy ether | 2 g |
| Miglyol 812 | 20 g |
| Phase B: | |
| Dextran 70 | 10 g |
| Lactose | 5 g |
| Water | 50 g | is used to prepare microbeads according to a protocol which comprises the preparation of the mixture of phase A at 70° C. and that of phase B at 70° C., the mixing of A and B, the homogenization of the resulting mixture by means of an apparatus of the Turrax type operating at an angular velocity of 5000 rpm for 5 minutes, the introduction of the resulting homogeneous mixture into the extruder and then the reproduction of the operating modalities described in Example 2. The lyophilized microbeads obtained have a particle size of 1.5 mm.

EXAMPLE 6 coating

The microbeads obtained in Example 1 were coated with the following coating solution:

| | |
|---|---|
| Ethyl cellulose | 12.5% by weight |
| Lactose | 10% by weight |
| Dibutyl phthalate | 1% by weight |
| Isopropanol | 66.5% by weight | in order to mask their after-taste.

1 kg of microbeads is introduced into a fluidized air bed apparatus of the GLATT WSG 5 type and the apparatus is heated to 50°–55° C. to give a temperature of 30°–35° C. in the coated product. The coating solution described above is sprayed at a rate of 2–4 mg/min and an atomization pressure of 2 bar for 120 minutes, with final drying for 30 minutes. This gives a coating representing about 5% of each microbead on a weight basis. The coated product has a neutral taste and is suitable for oral administration without substantial modification of its rate of release in the stomach.

EXAMPLE 7

Coating solution

A coating solution having the following formulation:

| | |
|---|---|
| Eudragit L 100 | 7.3% by weight |
| Dibutyl phthalate | 1.5% by weight |
| Talc | 1.8% by weight |
| Isopropanol | 89.4% by weight | is used to obtain an enteric coating for the microbeads of Example 2, the coating representing 5 to 10% by weight, based on the weight of said microbeads.

EXAMPLES 8–12

By following the operating modalities described in Example 1 and varying only the frequency of the vibrations, microbeads of paracetamol with diameters of 1.5 mm, 1.0 mm, 0.7 mm, 0.5 mm and 0.1 mm are obtained with vibrations of 50 Hz, 500 Hz, 1000 Hz, 2000 Hz and 10,000 Hz respectively.

EXAMPLES 13–14

Microbeads of flerobuterol

The following formulations:

| | Ex. 13 | Ex. 14 |
|---|---|---|
| Flerobuterol | 3 g | 3 g |
| Lactose | 25 g | — |
| Beta-cyclodextrin | — | 30 g |
| Dextran 70 | 25 g | 25 g |
| Sodium saccharinate | 3 g | 3 g |
| Water | 100 g | 100 g | are used to prepare microbeads according to the invention.

Diameter of the dies: 0.2 mm

Diameter of the microbeads: 0.5 mm

EXAMPLE 15

Microbeads of carbinoxamine

The following formulation:

| | |
|---|---|
| Carbinoxamine maleate | 20 g |
| Glycocoll | 20 g |
| Dextran 70 | 10 g |
| Aspartame | 5 g |
| Xanthan gum | 1 g |
| Water | 100 g | is used to prepare microbeads according to the invention.

Diameter of the dies: 0.2 mm

Diameter of the microbeads: 0.5 mm

EXAMPLES 16–17

Microbeads of modafinil

The following formulations:

| | Ex. 16 | Ex. 17 |
|---|---|---|
| Modafinil* | 100 g | 100 g |
| Sodium saccharinate | 2 g | 2 g |
| Dextran 70 | 10 g | 10 g |
| Tween 80 | 2 g | 2 g |
| Hydroxypropyl β-cyclodextrin | 100 g | — |
| Lactose or mannitol | — | 40 g |
| Xanthan gum | 1 g | 1 g |
| Water | 200 g | 200 g |

Note
*particle size of the modafinil: 2–5 μm are used to prepare microbeads according to the invention.

Diameter of the dies: 0.5 mm

Diameter of the microbeads: 1 mm

EXAMPLES 18–19

Microbeads of dexfenfluramine

The following formulations:

| | Ex. 18 | Ex. 19 |
|---|---|---|
| Dexfenfluramine* | 300 g | 300 g |
| Dextran 70 | 20 g | 20 g |
| Xanthan gum | 0.5 g | 0.5 g |
| Citric acid | 5 g | 5 g |
| Aspartame | 6 g | 6 g |
| Mannitol | 50 g | — |
| Beta-cyclodextrin | — | 50 g |
| Water | 300 g | 300 g |

Note
*particle size of the dexfenfluramine: 5–10 μm are used to prepare microbeads according to the invention.

Diameter of the dies: 0.5 mm

Diameter of the microbeads: 1.2 mm

EXAMPLE 20

Microbeads of loperamide

| | |
|---|---|
| Loperamide | 2 g |
| Aspartame | 20 g |
| Dextran 70 | 20 g |
| Tween 60 | 1 g |
| Xanthan gum | 1 g |
| Mannitol | 20 g |
| Water | 100 g | is used to prepare microbeads according to the invention.

Diameter of the dies: 0.5 mm

Diameter of the microbeads: 1 mm

EXAMPLE 21

Microbeads of lorazepam

The following formulation:

| | |
|---|---|
| Lorazepam | 2.5 g |
| Aspartame | 8 g |
| Polyvinylpyrrolidone | 25 g |
| Tween 60 | 1 g |
| Xanthan gum | 1 g |
| Dimethyl β-cyclodextrin | 40 g |
| Water | 100 g | is used to prepare microbeads according to the invention.

Diameter of the dies: 0.2 mm

Diameter of the microbeads: 0.5 mm

We claim:

1. A process for the preparation of particles each comprising an excipient forming a matrix and at least one active ingredient uniformly distributed in the mass of said matrix, said process comprising the steps of
   (1.) preparing a homogeneous mixture from
      (a) at least one active ingredient,
      (b) a physiologically acceptable hydrophilic excipient, and
      (c) water
   to give a pasty mixture with a viscosity below 1 Pa.s, measured at 15°–20° C.
   (2.) extruding the resulting homogeneous mixture at a temperature above 0° C. and fragmenting the extrudate to give moist particles;
   (3.) freezing the moist particles as they fall under gravity through a countercurrent stream consisting essentially of inert gas at a temperature below 0° C. to give at least partially frozen particles; and
   (4.) drying said at least partially frozen particles by freeze drying.

2. A process according to claim 1 wherein the extruding is carried out at 15°–20° C.

3. A process according to claim 1 wherein the pasty mixture containing water has a viscosity of between 0.1 and 0.3 Pa.s at 15°–20° C.

4. A process according to claim 1 wherein the hydrophilic excipient (b) comprises two essential components:
   (b1) a polymer component with a molecular weight greater than or equal to 10,000 daltons, which swells in the presence of water, and
   (b2) a water-soluble or water-dispersible component which acts as a diluent.

5. A process according to claim 4 characterized wherein component (b1) is a substance selected from the group consisting of gum arabic, xanthan gum, gum tragacanth, alginates, pectinates, polyvinylpyrrolidone, polyethylene glycols, cellulose, carboxymethyl cellulose, cellulose ethers, carboxymethyl chitin, dextran, chitosan, gelatin, acrylic and methacrylic polymers and copolymers, colloidal silica and mixtures thereof.

6. A process according to claim 4 wherein component (b2) is a substance selected from the group consisting of sugars and dextrins.

7. A process according to claim 4 wherein component (b2) is selected from the group consisting of lactose, glycocoll, mannitol, glucose, sucrose, maltodextrin, cyclodextrin and derivatives thereof, artificial sweeteners, natural or synthetic flavorings and mixtures thereof.

8. A process according to claim 1 wherein said preparing step (1.) comprises preparing a homogeneous mixture including:
   (a) 100 parts by weight of an active ingredient,
   (b1) 10 to 350 parts by weight of a polymer substance which swells in water, and
   (b2) 5 to 350 parts by weight of a substance selected from sugars, dextrins and mixtures thereof.

9. A process according to claim 1 wherein said preparing step (1.) comprises preparing a homogeneous mixture including:
   (b3) a surface-active component, especially in an amount of 0.05 to 3 parts by weight of said surface-active component per 100 parts by weight of active ingredient.

10. A process according to claim 1 wherein the freezing of step (3.) comprises initiating said freezing by circulating said stream of inert gas in countercurrent to the path of the moist particles, and then continuing said freezing down to a temperature in the range −18° to −80° C. in a lyophilizer.

11. A process according to claim 1 further comprising, after step (4.), the step of
   (5.) coating each of the resulting lyophilized particles with a continuous-wall polymer membrane.

12. A process according to claim 1 comprising the steps of
   (1.) preparing at room temperature a homogeneous mixture with a viscosity of between 0.1 and 0.3 Pa.s from
      (a) 100 parts by weight of an active ingredient,
      (b) a substantially hydrophilic excipient containing
         (b1) 10 to 350 parts by weight of a polymer component with a molecular weight greater than or equal to 10,000 daltons, which swells in water and is selected from the group consisting of gum arabic, xanthan gum, polyvinylpyrrolidone, carboxymethyl cellulose, cellulose ethers, dextran and mixtures thereof,
         (b2) 5 to 350 parts by weight of a water-soluble or water-dispersible component which acts as a diluent and is selected from the group consisting of lactose, glycocoll, mannitol, glucose, sucrose, maltodextrin, cyclodextrin and derivatives thereof, natural or synthetic flavorings and mixtures thereof, and
      (c) a sufficient amount of water to obtain said viscosity of 0.1–0.3 Pa.s;
   (2.) extruding the resulting mixture at 20° C. and fragmenting the extrudate into droplets by means of vibrations at a frequency of 50 to 10,000 Hz;
   (3.) freezing the resulting droplets by means of a countercurrent stream consisting essentially of inert gas at a temperature below 0° C. as said droplets fall under gravity, the freezing being continued in a lyophilizer down to a temperature of −30° C. to −50° C.; and
   (4.) removing the water in said lyophilizer by sublimation.

13. A process according to claim 1 wherein, in step (1.), the active ingredient is selected from the group consisting of paracetamol, probucol, piroxicam, phloroglucinol, tiadenol, flerobuterol, modafinil, dexfenfluramine, carbinoxamine maleate, loperamide, lorazepam and mixtures thereof.

14. A process according to claim 10 wherein said freezing is continued down to a temperature in the range of −30° to −50° C.

15. A process according to claim 12 wherein said substantially hydrophilic excipient further comprises (b3) 0.05 to 3 parts by weight of a surface-active component.

* * * * *